Feb. 15, 1955  H. C. J. FOCKE  2,702,172
CONTROL SYSTEM FOR AIRCRAFT HAVING
ADJUSTABLE SUSTAINING AIRFOILS
Filed March 25, 1952
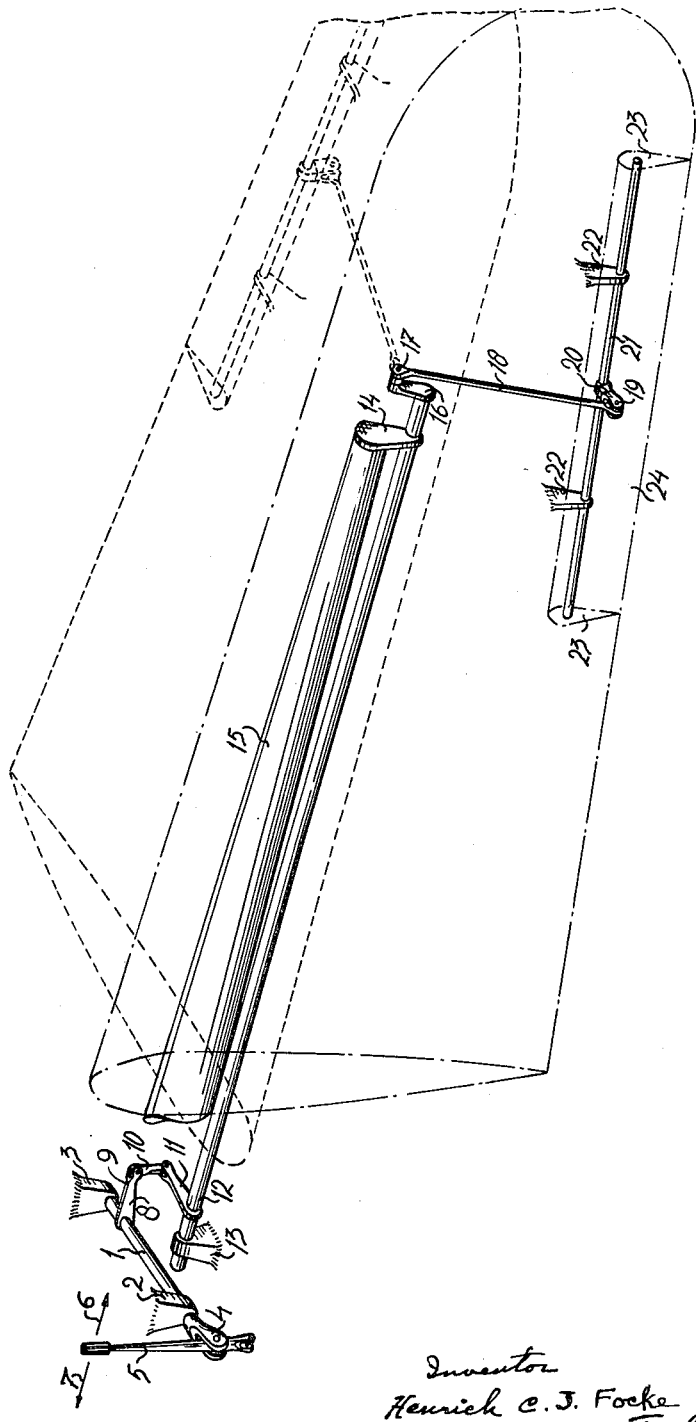
Inventor
Henrich C. J. Focke
by- Toulmin & Toulmin
Attys.

United States Patent Office 2,702,172
Patented Feb. 15, 1955

2,702,172

CONTROL SYSTEM FOR AIRCRAFT HAVING ADJUSTABLE SUSTAINING AIRFOILS

Henrich Carl Johann Focke, Sao Joze dos Campos, Sao Paulo, Brazil, assignor to Ministerio da Aeronautica, Diretoria do Material, Rio de Janeiro, Brazil Application March 25, 1952, Serial No. 278,379

3 Claims. (Cl. 244—48)

The present invention relates to an improved flying machine of the kind described in the copending United States application No. 278,378 filed March 25, 1952, now abandoned, adapted to be transformed from a condition for horizontal or substantially horizontal flight into a condition for vertical or substantially vertical flight, and vice versa, by swinging the axes of the propellers together with the sustentation surfaces or part thereof about an axis transverse to the axes of the propellers and transverse to the longitudinal axis of the machine.

In effecting such transformation, certain control elements for steering the machine, lose their function or interchange same with other steering elements. Now, for the pilot of the flying machine it is, psychologically very difficult to adapt himself quickly to the altered condition, that is to say, to control and steer the machine in both flying conditions in an absolutely correct manner. For instance in the position of the propellers and sustentation surfaces for operating the machine as a helicopter, the control function of the ailerons has to be rendered inoperative and has to be taken over by the control effected by variation of the propeller pitch whilst on the other hand, when changing to the condition for rapid forward flight, the steering effect of the ailerons should again become effective and that by pitch variation ineffective.

To this end the present invention has for its object to provide means through which the required variation in the control of the flying machine is automatically effected, independent of the will of the operator, therefore without intervention of the operator or without requiring the operator to make alterations in the manner of controlling the steering stick or other steering means.

According to the invention, this object has been attained by the provision in the mechanism for transmitting the steering impulses to steering elements which in transforming the flying machine by angular displacements of the propeller axes, lose or interchange their functions, of means adapted to render such steering elements inoperable or operable according to the change of position of the propellers and planes.

In practice this idea may be realised by incorporating in said transmitting mechanism a first member pivotable about an axis and pivotably connected in a point outside such axis to a second member, in turn pivotably connected to the steering element to be controlled said second member, during transformation of the machine, being automatically transposed thereby in such a manner, that the angle between the centre line of said first member and said second member decreases to zero, or increases from zero to the normal operative value, as the case may be.

This therefore means—again taking the example of controlling the machine by turning it about its longitudinal axis—that when operating the steering stick, with the machine in the condition for vertical or substantially vertical flight, the transmitting members leading to the ailerons, remain stationary or approximately so and the ailerons remain inactive, whilst as far as the steering by variation of the propeller pitch is concerned, such members do receive a steering impulse and, vice versa, when transforming the machine into the condition for rapid forward flight, the control by pitch variation automatically disappears and that by the ailerons becomes active.

It is of course understood, that the invention is not limited to the steering of the flying machine by rolling it about its longitudinal axis.

The invention will hereinafter be further described with reference to the accompanying drawing, representing by way of example a diagrammatical view of the mechanism for operating the aileron of one sustentation surface of a transformable flying machine as above referred to.

To enable such mechanism to be clearly shown, the sustentation surface proper has not been shown in full lines, but has been schematically indicated only, to wit in dotted lines in its normal position for forward flight and in mixed lines in the position to which it is swung together with the propeller axes when conditioning the machine for vertical or substantially vertical flight.

Referring to the left hand portion of the figure, 1 represents a shaft, extending lengthwise of the fuselage (not shown) of the flying machine and journalled in fixed bearings 2 and 3 such shaft having a forked head 4 for pivotal connection to the usual steering stick 5 which, as is well known for those skilled in the art, is both movable lengthwise of the machine and laterally in the direction of the arrows 6, 7.

Adjacent its rear bearing block 3 the shaft 1 carries an arm 8 secured thereto and terminating in a fork 9 for pivotal connection to a link 10 being so twisted, that its free end lies in a plane parallel to the axis of the shaft 1. This free end of the link 10 is articulated to the forked end of a second arm 11 in turn secured to a shaft 12 extending inside the respective sustentation surface and lengthwise thereof, such shaft being rotatably supported at its inner end by a bearing 13 and near its outer end by an arm 14 depending from the free end of a spar 15, around which the sustentation surface is adapted to be swung in a manner not shown in the drawing as it has nothing to do with the present invention and will be apparent for those skilled in the art.

The shaft 12 somewhat extends beyond the supporting arm 14 and has secured to its free end a crank 16 carrying a crank pin 17 to which is pivotally attached one end of a rod 18 which at the opposite end is pivotable about a pin 19 mounted in a fork 20 secured to a shaft 21. This shaft 21 is rotatably supported in blocks 22 mounted within the sustentation surface and at its ends is secured to the end frames 23 of the usual aileron 24, set in a cut out portion of such plane.

From the above description, it will appear, that by swinging the steering stick 5 in the direction of the arrow 6 or 7, shaft 1 is rocked and thereby through the arm 8, link 4 and arm 5, rocks the shaft 12 causing thereby an angular displacement of the crank 16 about the axis of this shaft.

Now, as appears from the drawing, the relative position of the crank 16 and the rod 18 is so chosen, that in the dotted line position of the sustentation surface for normal forward flight, the rod 18 is approximately at right angles to the line connecting the axis of the crank 16 with the axis of the crank pin 17, so that an angular displacement of the crank 16 will cause a corresponding axial movement of the rod 18 resulting in an angular movement of aileron for steering purposes. On the other hand, when the sustentation surface is swung about the spar 15 into the (mixed line) position corresponding with the position of the propellers for vertical or substantially vertical flight (which relative position is shown in full lines in the drawing), the rod 18 extends approximately parallel to the crank 16 or in other words includes an angle of approximately 0° with the connecting line above referred to, so that an angular displacement of the crank 16 will cause a very small swinging movement of the upper end of the rod 18 about the pin 19 of the fork 20, only, which does not influence the aileron 24 as it does not cause any rocking of the shaft 21. This is as it should be because in this condition of the sustentation surface, the aileron has lost its steering function which has to be taken over by the steering through variation of the propeller pitch.

In the drawing, the mechanism according to the invention has been illustrated for one sustentation surface only. It will however be understood that a similar mechanism is provided for the other sustentation surface and that in the example chosen for elucidating the invention, there is also a mechanism acting on the same principle, arranged in the means for transmitting the steering impulses from the steering stick to the means for controlling the propeller pitch by varying the angle of attack of the propeller blades, which mechanism in that case is so that the blade adjusting means are not influenced in the position of the propellers and sustentation surfaces for normal forward flight, and vice-versa are influenced if the machine is conditioned for vertical or substantially vertical flight.

What I claim is:

1. In combination, a member tiltable about a pivot axis, a control element pivotally mounted on said member, a crankarm associated with said member rotatable about an axis parallel to and displaced from said pivot axis, a link connecting the free end of said crankarm with said control element so movement of the crankarm will move the control element with respect to said member, the point of connection of said crankarm with said link substantially coinciding with said pivot axis when the control element is in a neutral position, and said member having one position of rotation about said pivot axis where the link extends from said crankarm at a substantial angle thereto and another position about said pivot axis where the link extends substantially parallel to said crankarm, whereby with the member in the first-mentioned position substantial operative movement of the control element results when the crankarm is moved, but when the member is in its said other position movement of the crankarm over its normal operative range effects substantially no movement of said control element.

2. In an aircraft having a fuselage and a wing tiltable about a pivot axis thereon; a control element movably carried by the wing, a crankarm in the wing rotatable about an axis parallel to and displaced from said pivot axis, a link connecting the free end of said crankarm with said control element so that movement of the crankarm will move the said element with respect to said wing, the point of connection of said crankarm with said link substantially coinciding with said pivot axis when the control element is in a neutral position, said wing having one position where the link extends at a substantial angle to said crankarm whereby movement of the crankarm will effect operative movement of said control element, and said wing having another position where the link extends substantially parallel to said crankarm whereby movement of the crankarm over its normal operative range will effect substantially no movement of the said control element.

3. An arrangement according to claim 2 in which the said crankarm is mounted on a control rod extending substantially parallel to said pivot axis to a point internally of said fuselage, and a control lever within the fuselage is operatively connected with said rod.

References Cited in the file of this patent

UNITED STATES PATENTS 2,063,030     Crouch _____ Dec. 8, 1936